INVENTORS
ROBERT ALFRED DEWAR
VOLKER ELMAR MAIER
BY Cushman, Darby & Cushman
ATTORNEYS

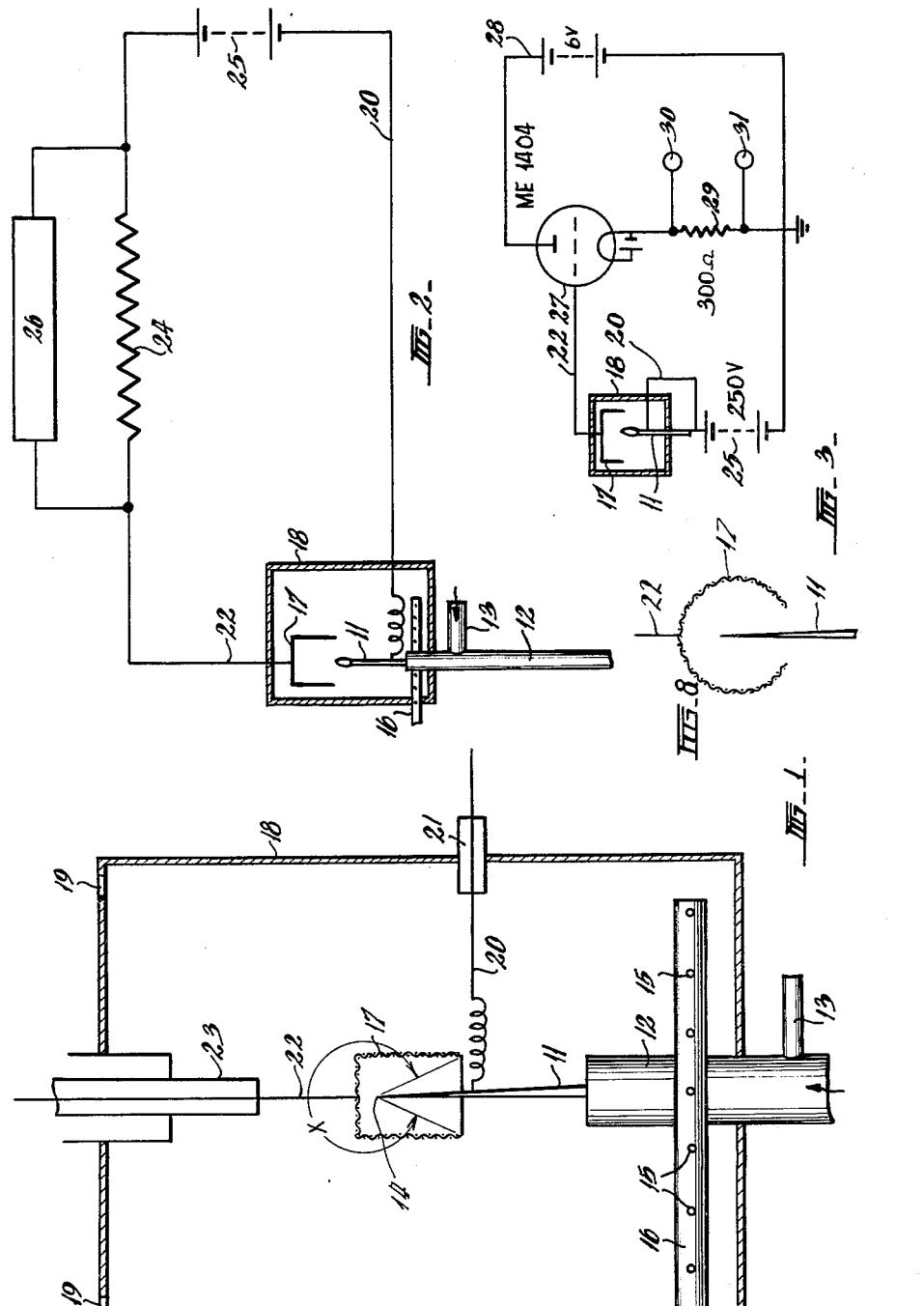

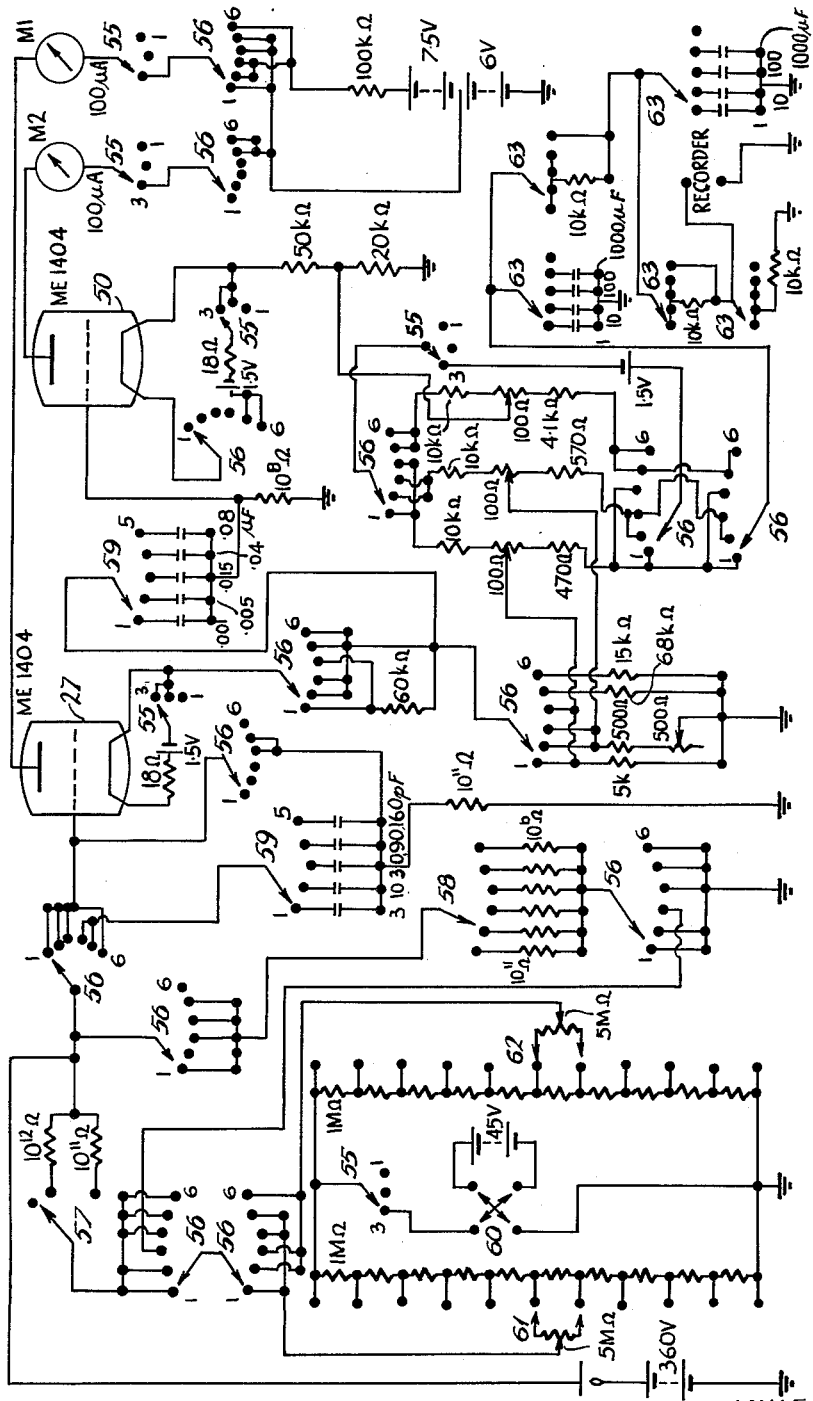

United States Patent Office

3,215,499
Patented Nov. 2, 1965

3,215,499
APPARATUS FOR DETECTING THE PRESENCE OF ORGANIC GASES AND VAPOURS
Robert Alfred Dewar, East Malvern, Victoria, and Volker Elmar Maier, Oakleigh, Victoria, Australia, assignors to Imperial Chemical Industries of Australia and New Zealand Limited, Melbourne, Victoria, Australia, a corporation of Victoria, Australia
Filed Nov. 16, 1961, Ser. No. 152,851
Claims priority, application Australia, Nov. 18, 1960, 66,708/60
9 Claims. (Cl. 23—255)

The present invention relates to new and improved methods and apparatus for detecting the presence of organic gases and vapours according to the ionization of a gas flame.

The copending application of McWilliam, Serial No. 745,462, filed June 30, 1958, now U.S. Patent 3,039,856, describes an instrument by which very small concentrations of organic vapours can be detected by measuring the increase in conductivity of a flame burning hydrogen, caused by the presence of the organic vapours, and appropriate circuitry is described using thermionic valves. This invention is directed to an improvement in or modification of the invention described and claimed in the McWilliam application, Serial No. 745,462, referred to above.

We have discovered that by modifications to the circuitry the linear relationship between organic vapour concentration and detector response shown in the above-mentioned application can be changed into other mathematical relationships, namely logarithmic, first derivative and second derivative.

These modifications are useful, especially when the detector is used for gas chromatography, in facilitating the interpretation of the measurements, and reducing certain practical difficulties.

Thus by making the response proportional to the logarithm of the input, or a function similar to the logarithm, the instrument is made sensitive to small changes in the input. At the same time, large changes in the input automatically produce progressively attenuated output responses, so that the indicating or recording meter is not overloaded, and the indicating pointer or recording pen remains within the limits of the scale of the instrument.

By making the response proportional to the first or second derivatives of the input (that is to say, the mathematical equivalent of differentiating the linear response function with respect to time, either once or twice), it is possible to perceive more sensitively the partial superposition of the chromatograms of two or more substances emerging from a gas chromatograph, and also it is possible to reduce the annoyance which results from a slow drift in the output signal caused by a slowly changing residual amount of organic vapour from a previous test emerging from the column, or arising from volatilisation or decomposition of the materials in the column packing.

The logarithmic response, or quasi logarithmic response, may be secured by using a triode valve under conditions in which the grid is absorbing positive current flowing through the flame, i.e. when electrons are being emitted from the grid itself. It is known from prior art that a triode under such conditions may give an anode current change proportional to the logarithm of this grid current, but it is not obvious that when used with the flame ionization detector the flame resistance would always be so high (relative to the resistance of the rest of the grid circuit) that it would be current controlling in all cases, and that, since the current so controlled is proportional to the concentration of organic vapour in the flame, the grid current would always, in turn, be proportional to the concentration of organic vapour in the flame, and hence the changes in the anode current would be proportional to the logarithm of the concentration of the organic vapour in the flame. It has also been discovered that when the gas flow and composition fed to the flame are suitable for use in gas chromatography, the flame current when no organic vapour is present is sufficient to bias the grid to a voltage for which the valve characteristics are such that the change in the anode current of the valve is proportional to the logarithm of the grid current. This is fortunate since although it is possible to bias the grid by an independent source of potential, this bias must be conveyed to the grid by means of a resistor of higher resistance than that of the flame when organic vapour is absent, otherwise the logarithmic characteristic will be partly lost. Since the resistance of the flame is extremely high, it is difficult to obtain from commercial sources stable resistors of suitably high resistance. When operating the circuit logarithmically, the grid must have either no means of electrical connection to ground other than the flame itself, or connection to ground through a resistor of higher resistance than that of the flame itself when no organic vapour is present. By "ground" is meant a point in the circuit connected to the cathode or separated from the cathode by a total resistance very low in comparison with the flame resistance.

To obtain the first derivative function, a resistance-capacitive differentiating circuit is included either in the input or the output of the valve circuit. Normally such resistance-capacitive circuits necessarily involve a considerable loss of sensitivity. It has been discovered, however, that by raising the values of the dropping resistors completing the flame and high voltage battery circuit to resistances lower than the resistance of the flame when organic vapour is absent but higher than is normally possible (because of drift in the output signal) when using the linear circuit of the McWilliam application the loss of sensitivity occasioned by the resistance-capacitive differentiating circuit can be substantially compensated.

The second derivative is obtained by using two of the above differentiating circuits together in the same circuit. It may be necessary in this circuit to include a damping circuit in the output, since we have discovered that, otherwise, rapid oscillations are sometimes obtained due to the accentuation of the electrical "noise" from the flame.

All these circuits may be combined, with a linear response circuit included, using a single valve by suitable switching arrangements. Alternatively a second valve may be used for the second differential function. Other switching arrangements may be provided to change the time-constants of the differentiating circuits to suit the various rates of change of the quantities being measured, to alter the required bias voltage in the grid or output circuits, to bring the indicating or recording instrument on to a suitable point on its scale in each case, and to calibrate the logarithmic response by determining the amount of the deflection on the indicating or recording instrument corresponding to a tenfold charge in grid current. When the last mentioned determination has been performed, a suitable scale in arbitrary units may be constructed so that the indicating or recording instrument can be read directly in units linearly proportional to the input signals. This scale is constructed, to give a concrete example, in the following manner. Let us suppose that the whole apparatus is adjusted to give three decades of electrical responses, corresponding to main points on a logarithmic scale designated 1, 10, 100, 1000. Now let us suppose that the indicator rests upon the unit figure in this scale when no organic vapour is present in the flame. We have then the anomaly that the input signal which it is required to measure (as distinct from the steady current due to the flame by itself), is zero, but the indicator rests upon unity on the scale. To correct this anomaly we have found that if unity (as in the present example) is subtracted from all the figures present on or implied to be present on the original scale, then a new scale appears which is just what is required. Thus the positions marked 1, 11, 101, 1001 on the old scale appear as 0, 10, 100, 1000 on the new scale. The new scale is practically identical with the old in the higher ranges (e.g. 100 to 1000) but is quite different in the lower ranges, especially 0 to 1, since zero cannot be shown at all on a true logarithmic scale as it lies at infinity.

The present invention accordingly provides a new and improved method of detecting quantitatively the presence of an organic gas or vapour in a test gas, which includes the steps of: passing the test gas into the region of the combustion zone of a hydrogen flame, applying an electrical potential difference across the flame to a controlling electrode, i.e. a grid, of a thermionic valve having at least an anode and a cathode in addition to the said grid, and measuring the current flowing from the anode to the cathode of the valve. The grid is unconnected to ground or is connected to ground through a component having a greater resistance than the flame in the absence of organic vapour.

Preferably, the hydrogen fed to the flame is mixed with an inert gas, for example nitrogen, in order to reduce the flame temperature. The preferred gaseous fuel is a mixture consisting of, by volume, 40% hydrogen and 60% nitrogen, a variation of 5% being permissible without much loss of sensitivity, i.e. 35% to 45%, hydrogen and 55% to 65% nitrogen.

The present invention also provides a new and improved apparatus for detecting quantitatively the presence of organic gases or vapours in a test gas, comprising: a burner; a source of gaseous fuel including as sole combustible constituent hydrogen gas; means for supplying said gaseous fuel from said source to the burner; means for feeding the test gas to the combustion zone of the burner; means for excluding from the combustion zone dust and all organic gases and vapours other than those included in said separate gas; a collecting electrode spaced from the burner and extending above the burner flame; means for conducting combustion products away from the combustion zone; means for applying an electric potential difference across the flame from the burner to the collecting electrode; a thermionic valve having at least three electrodes; an electrical connection between the collecting electrode and a controlling electrode of the vacuum tube, i.e. a grid, which is unconnected to ground or is connected to ground through a component having a greater resistance than the resistance of the flame in the absence of organic vapour; and means for measuring the current flowing through the valve between the anode and the cathode.

Apparatus according to the present invention includes new and improved means for detecting quantitatively the presence of organic gases and vapours, including: a burner; a source of a mixture consisting of hydrogen and nitrogen in constant proportions within the range 55% to 65% by volume of nitrogen and 45% to 35% hydrogen; means for supplying said hydrogen/nitrogen mixture at a constant rate from said source to the burner; means for feeding a separate gas in which the organic gas or vapour is to be detected to said hydrogen or said nitrogen or said hydrogen/nitrogen mixture before said mixture reaches said burner; a casing for excluding from the combustion zone of the burner dust and all organic gases and vapours other than those included in said separate gas; means for supplying to said combustion zone at a constant rate of flow an oxygen-containing combustion-supporting gas of constant composition, free from dust and free from organic vapour; a metal collecting electrode completely insulated from the casing and extending above the burner flame at a constant location with respect to the burner; means for conducting combustion products away from the combustion zone; an electrical circuit which includes, connected in series, the collecting electrode, a source of direct current, the burner nozzle, and the hydrogen flame; in combination with said electrical circuit a thermionic valve having at least an anode, a cathode and a controlling grid unconnected to ground or connected to ground through a component having a greater resistance than the resistance of the flame in the absence of organic vapour; an electrical connection between the collecting electrode and the grid of the valve and means for measuring the current flowing through the valve between the anode and the cathode.

To obtain a logarithmic response it has been found that, if the controlling grid is connected to ground, the component through which it is connected should have a resistance at least as high as that of the flame in the absence of organic vapour, which varies between $10^{12}$ and $10^{13}$ ohm.

The electrical circuit of this apparatus may be modified by interposing between the grid and ground a resistance less than the resistance of the flame in the absence of organic vapour, i.e. less than $10^{12}$ ohm; and interposing a resistance-capacitive differentiating circuit in the electrical connection between the flame electrode in the grid, or alternatively a resistance-capacitive differentiating circuit may be included with the measuring means between the anode and the cathode. In this way the first derivative function may be obtained.

To obtain the second derivative function, a resistance-capacitive differentiating circuit is interposed between the collecting electrode and the grid and a further resistance-capacitive differentiating circuit is included with the measuring means between the anode and the cathode, either directly or by means of a second valve circuit.

We have found that the range of concentration over which the conductivity of the hydrogen flame is linear, i.e., proportional to the concentration of organic material in the test gas, is greatly extended, and the minimum voltage required to produce the saturation current through the flame is reduced, if the collecting electrode is shaped so that it extends above and around the burner nozzle to subtend at the burner nozzle an angle greater than 90°, and that this extension of the linear range is particularly large when the collecting electrode extends above, around and below the burner nozzle so that it subtends at the burner nozzle an angle greater than 180°.

By the extension of the range of linear relationship between organic vapour concentration and detector response, which is achieved according to the present invention by means of the modified collecting electrodes of hollow, generally bell shape, the range over which the linear relationship can be changed to other mathematical relationships by modifications of the circuitry can be extended correspondingly.

The present invention accordingly provides a modification of the flame ionisation detector according to the copending application of McWilliam, Serial No. 745,462, characterised in that the collecting electrode is made from electrically-conductive material and is hollow in shape extending above and around the burner nozzle to subtend at the burner nozzle an angle greater than 90°, preferably greater than 180°.

Examples of suitable constructions for the collecting electrode are a hollow sphere with a small aperture, to allow the burner to pass through with a clearance all round to terminate within the sphere, or a hollow cylinder of length several times the width closed at one end, or a bell shape. Preferably, the electrode is formed from foraminous metal, e.g. copper, platinum or stainless steel gauze, and in any case it is essential that means be provided, such as a perforation in the electrode, for conducting the products of combustion away from the combustion zone. With these arrangements, it has been found that a smaller potential difference is required across the flame for satisfactory operation of the instrument, and that the linear range of the flame response, and consequently the range over which the response can be converted from linearity to other relationships, is considerably extended.

Practical examples of methods and apparatus according to the present invention will now be described with reference to the accompanying drawings. In these drawings:

FIG. 1 is a diagrammatic sectional elevation of the burner, casing, flame electrode and associated apparatus;

FIG. 2 is a diagram of the circuit disclosed in the copending application Serial No. 745,462, filed June 30, 1958, modified by the incorporation of the bell-shaped electrode of the present invention.

FIG. 3 is a diagram of a circuit from which is derived the logarithm of the current flowing in the flame circuit of FIG. 2;

Figure 4:
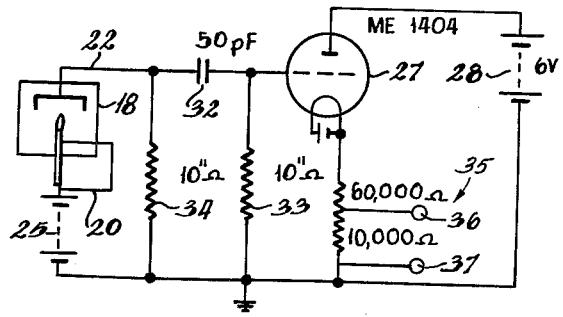
FIG. 4 is a diagram of a circuit from which is derived the first derivative with respect to time of the expression representing the current flowing in the flame circuit of FIG. 2 as a function of time.

FIG. 7 is a combined circuit from which circuits resembling those of FIGS. 2, 3, 4 and 6 can be selected together with a further circuit supplying the first derivative with respect to time of the expression representing the logarithm of the current flowing in the flame circuit of FIG. 2 as a function of time, and means of calibrating the logarithmic circuit, and means of adjusting the various necessary voltages according to the conditions required for operation, and FIG. 8 shows an alternative form of collecting electrode.

Referring now to FIG. 1 of the drawings, the burner consists of a vertical stainless steel hypodermic needle 11 mounted at the end of a tube 12 made from electrically insulating material. A mixture consisting of hydrogen and nitrogen in the proportion of 40% hydrogen and 60% nitrogen, by volume, is supplied to the tube 12 from a source (not shown). The test gas, in which the presence of organic gas or vapour is to be detected, can be fed as desired into the tube 12 through the side tube 13. Combustion takes place at the tip 14 of the needle 11 and is supported by filtered, organic gas-free air supplied through apertures 15 in the pipe 16. A collecting electrode 17 formed from metal gauze, e.g. copper, platinum or stainless steel, in the shape of a cylinder closed at the top end and having a diameter of approximately 1 cm. and a depth approximately 3 cm. is inverted over the tip 14 of the needle with the open end approximately 2 cm. below the tip of the needle. The angle subtended by the periphery of the electrode at the burner nozzle, i.e. the angle X, is therefore greater than 180°.

The needle 11, tube 16 and electrode 17 are enclosed within a cylindrical dust-proof casing 18 approximately two inches in diameter and three inches high, having openings 19 in the top thereof which are large enough to permit the products of combustion to escape but not large enough to allow dust or organic gases to enter against the stream of escaping combustion products.

The needle 11, which is electrically insulated entirely from the casing 18, is connected to an electrical conductor 20 passing through an insulator 21 in the wall of the casing 18. An electrically conducting lead 22 extends vertically from the centre of the closed end of the electrode 17 in alignment with the needle 11 to pass through the insulator 23 in the top of the casing 18. It is essential that the electrode 17 be effectively insulated from the casing 18, and by locating the insulator 23 vertically above the flame this is ensured as a result of the heat from the flame evaporating moisture that otherwise might condense on the insulator from the products of combustion. The lead 22 is gripped tightly within the insulator 23 to positively retain the electrode 17 at the desired spacing from the needle tip 14. This spacing can be varied by drawing the lead 22 longitudinally through the insulator 23 against the friction therein.

In the known arrangement shown in FIG. 2, the leads 20 and 22 may form part of an electric circuit, which also includes a resistance 24 and a battery 25. By coupling a recorder 26 across the resistance 24, the variation of the current flowing in the circuit, i.e. the current flowing through the flame from the needle 11 to the electrode 17, can be observed as a function of time, giving a graph having peaks at locations each characteristic of one of the organic compounds present in the test gas. When the detector is used with vapour phase chromatographic apparatus (not shown in the drawing), the test gas may alternatively be mixed with the hydrogen-containing combustion gas mixture prior to entry into the chromatographic column, and the mixture then enters the detector through line 12, the line 13 being closed.

To demonstrate the advantages arising from the use of a collecting electrode according to the present invention, a steady sample concentration of n-hexane (prepared by maintaining n-hexane in equilibrium with a mixture of 50% by volume nitrogen and 50% by volume hydrogen at a temperature of −78.5° C.) was supplied at a constant rate of 1 ml. per second to a burner constituted by a 23 gauge (0.64 mm. diameter) hypodermic needle. A direct current electric potential was applied from the burner to the collecting electrode, with the burner positive with respect to the electrode, and the minimum value of this potential required to produce saturation current through the burner flame was determined for various electrode constructions.

With a collecting electrode consisting of a flat circular disc of metal gauze located 1 cm. above the burner nozzle, a potential of 70 volts was required to produce saturation current.

When the collecting electrode consisted of a cylinder formed from metal gauze, i.e. electrode 17 in FIG. 1, a potential of only 10 volts was required to produce saturation current.

In a further experiment, the range of concentration of sample over which a linear response was obtained was determined for the metal gauze cylindrical electrode 17, and for a collecting electrode consisting of a metal rod. Ethylene was used as the organic gas, and was fed to a mixture of equal volumes of nitrogen and hydrogen supplied at a constant rate of 1 ml. per second to a burner constituted by a 23 gauge hypodermic needle. With the gauze electrode 17, the saturation current was proportional to the ethylene concentration up to a concentration of $10^{-4}$ g./ml. of ethylene. With the rod electrode, the saturation had ceased to be proportional to the ethylene concentration above a concentration of $10^{-7}$ g./ml. of ethylene.

It is thus apparent that the electrode of this invention improves flame ionisation detectors by permitting the use of reduced voltages to achieve saturation current, and by extending the range over which the instrument response is proportional to the concentration of organic constituents in the test gas.

If the logarithm of the current observed in the circuit of FIG. 2 is plotted against time, the amplitude of the large peaks relative to the small peaks is reduced, so that the range of the apparatus is increased.

If the first derivative with respect to time of the current observed in the circuit of FIG. 2 is plotted against time, each peak in the graph obtained from the circuit of FIG. 2 will appear in the graph of the first derivative as a positive peak adjacent to a negative peak, the graph crossing the time axis at a point corresponding to the original peak. Linear drift, when differentiated, results in a constant displacement of the graph with respect to the time axis, and, as the peaks are steep, the accuracy of the results is not impaired by this displacement. Consequently, the use of the first derivative reduces difficulty in interpreting results accompanied by drift. Furthermore, two peaks in the graph derived from the circuit of FIG. 2 may be so close together that it is impossible to separate them with certainty, yet after differentiation the position of the peaks, i.e. the identity of the components of the test gas, can be definitely decided.

The discrimination of the detector is in some cases still further increased by plotting against time the second derivative of the current observed in the circuit of FIG. 2 with respect to time.

Electrical means are known for obtaining the logarithm, the first derivative, the second derivative, and the derivatives of the logarithm, of an electrical signal.

FIG. 3 shows a circuit whereby the logarithm of the current may be obtained. A positive potential of 250 volts is applied to the needle 11 by the battery 25, and the electrode 17 is connected directly to the grid of an amplifier triode 27, which is a Mullard type ME1404 valve. A comparatively low potential of approximately 6 volts is applied between the anode and the cathode by the battery 28. The negative terminals of the batteries 25 and 28 are both grounded, and the cathode is also connected to ground through a 300 ohm resistor 29. The current flowing in the anode circuit is measured by a recorder connected across the resistor 29, between terminals 30 and 31, and is a measure of the logarithm of the current flowing through the flame from the needle 11 to the collecting electrode 17.

One modification of the circuit shown in FIG. 3 to obtain the first derivative with respect to time of the mathematical statement expressing the current flowing between the needle 11 and the electrode 17 as a function of time is shown in FIG. 4. A 50 picafarad condenser 32 is interposed in the lead 22 between the electrode 17 and the grid of the valve 27, both sides of the said condenser being connected to ground through resistances 33 and 34 of $10^{11}$ ohm. The resistance 34, connecting the collecting electrode 17 to the ground, is very much less than the $10^{12}$ to $10^{13}$ ohm resistance possessed by the flame in the absence of organic vapour. The resistance 29 (of FIG. 3) is in this modification replaced by a 70,000 ohm resistor 35, of which a 10,000 ohm portion is tapped between terminals 36 and 37. A recorder connected between the terminals 36 and 37 provides a measure of the first derivative with respect to time of the function representing in terms of time the current flowing between the needle 11 and the electrode 17.

Figure 5:
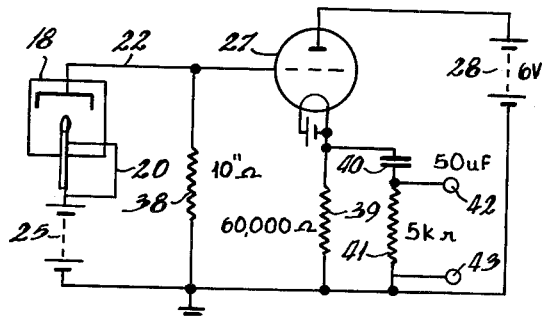
FIG. 5 is a diagram of an alternative circuit to that of FIG. 4 for obtaining the first derivative function.

An alternative modification of the circuit shown in FIG. 3 to obtain the first derivative of the current passing through the flame is shown in FIG. 5. The lead 22 joining the electrode 17 to the grid of the valve 27 is connected to ground through a $10^{11}$ ohm resistor 38, i.e. through a resistance smaller than that of the flame in the absence of organic vapour. The cathode of the valve 27 is connected to ground through a 60,000 ohm resistor 39, and, in parallel therewith, a 50 microfarad condenser 40 connected in series with a 5,000 ohm resistor 41. A recorder connected across the resistor 41, to terminals 42 and 43, gives the first derivative with respect to time of the mathematical expression representing the current flowing between the needle 11 and the electrode 17 as a function of time.

Figure 6:
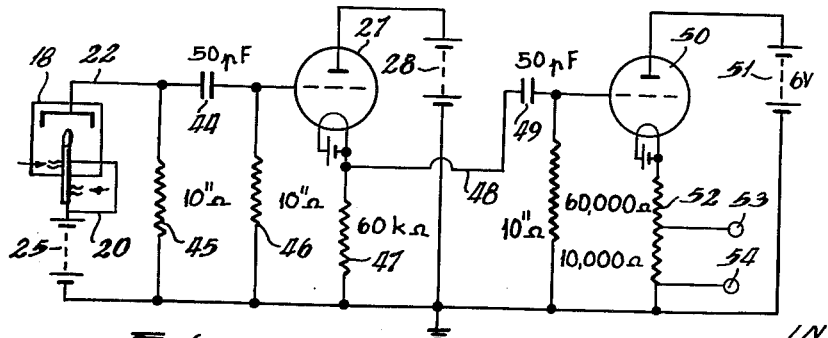
FIG. 6 is a diagram of a circuit from which is derived the second derivative with respect to time of the expression representing the current flowing in the flame circuit of FIG. 2 as a function of time.

To obtain the second derivative with respect to time of the mathematical expression representing the current flowing between the needle 11 and the electrode 17 as a function of time, the circuit of FIG. 3 may be modified as shown in FIG. 6. A 50 picafarad condenser 44 is interposed in the lead 22, both sides being connected to ground through $10^{11}$ ohm resistors 45 and 46. The collecting electrode 17 is thus connected to the ground through a resistance smaller than that of the flame in the absence of organic vapour. The cathode of the valve 27 is connected to earth through a 60,000 ohm resistor 47, and in parallel therewith a second differentiating circuit. This second differentiating circuit comprises a lead 48 connecting the cathode of the valve 27, through a 50 picafarad condenser 49 to the grid of a second Mullard Me1404 valve 50. A 6 volt battery 51 is connected between the anode of the valve 50 and ground. The cathode of the valve 50 is connected to ground through a 70,000 ohm resistor 52, of which 10,000 ohms is enclosed between tappings connected to terminals 53 and 54, across which a recorder may be connected to give an indication of the desired second derivative.

The values of the various electrical components of the circuits in FIGS. 3 to 6 can be varied as required to yield optimum results in any particular circumstances. Suggested ranges of value are the following:

Battery 25; 100 to 300 volts
Condenser 32; 10 to 1,000 picafarads
Condenser 40; 1 to 100 microfarad
Resistance 41; 1,000 to 10,000 ohm
Condenser 44; 1 to 1,000 picafarads
Condenser 49; 10 to 1,000 picafarads FIG. 7 shows a circuit from which circuits similar to those of circuits of FIGS. 3 to 6 can be selected by appropriately setting switches. Switch 55 at position 1 disconnects all circuits, at position 2 supplies current to the valve filaments, and at position 3 energizes all circuits. Switch 56 selects the type of circuit used. Position 1 introduces a linear response circuit similar to that of FIG. 2, i.e. of McWilliams, Serial No. 745,462; position 2 introduces a logarithmic response circuit similar to that of FIG. 3; position 3 introduces circuit components which enable the logarithmic response to be calibrated; position 4 introduces a differentiating circuit similar to that of FIG. 4; position 5 introduces a circuit similar to that of FIG. 6 for supplying the second derivative; and position 6 introduces a circuit which supplies the first derivative with respect to time of the logarithm of the current flowing in the linear circuit of position 1. Switch 57 permits connection of a suitable bias resistor to the grid of valve 27. Switch 58 permits the sensitivity of the detector to be varied. Switch 59 permits the selection of a suitable time constant for the differentiating circuits, i.e. the scale or peak width of the graph derived from the results; position 1 gives a peak width between 1 and 5 seconds; position 2 a peak width between 5 and 20 seconds; position 3 a peak width between 20 and 60 seconds; position 4 a peak width between 60 and 180 seconds; and position 5 a peak width between 180 and 500 seconds. Switch 60 permits reversal of the polarity of the bias supplied to the grid of valve 27. Switch 61 permits variation of the bias applied to the grid of valve 27 when employing differentiating circuits. Switch 62 permits variation of the bias applied to the grid of valve 27 when employing logarithmic circuits. Switch 63 permits the interpolation between the detector and the recorder of a filter to filter out alternating components, i.e. "noise," from the response derived from the detector.

An alternative construction of the collecting electrode 17, whereby metal gauze is shaped as a hollow sphere having an aperture through which the needle 14 passes with a clearance all around to terminate within the sphere, is shown in FIG. 8.

From the foregoing description of the various embodiments of this invention, it is evident that the objects of this invention, together with many practical advantages are successfully achieved. While preferred embodiments of our invention have been described, numerous further modifications may be made without departing from the scope of this invention. Therefore, it is to be understood that all matters herein set forth or shown in the accompanying drawings are to be interpreted in an illustrative, and not in a limiting sense.

What is claimed is:

1. Apparatus for detecting quantitatively the presence of organic gases and vapours in a test gas, comprising:
    (1) a burner assembly;
    (2) means for supplying gaseous fuel which includes as the sole combustible constituent hydrogen gas;
    (3) means for feeding the test gas to the combustion zone of said burner assembly;
    (4) means for excluding dust and organic gases and vapours other than those included in said test gas;
    (5) means for supplying a constant flow of oxygen-containing combustion-supporting gas to said combustion zone free from dust and organic vapors;
    (6) spaced from said burner assembly an electrically-conductive hollow collecting electrode extending above, around and below the burner nozzle to subtend at the burner nozzle an angle greater than 180°;
    (7) means for conducting the products of combustion away from the combustion zone;
    (8) an electric circuit measuring means including means for
        (a) applying an electric potential difference across the flame from said burner assembly to said electrode; and
        (b) indicating means for measuring the current flowing through the flame between said burner assembly and said electrode.

2. Apparatus according to claim 1, wherein said collecting electrode includes a hollow sphere having an aperture in the surface through which aperture the burner passes with a clearance all round to terminate within the sphere.

3. Apparatus according to claim 1, wherein said collecting electrode includes a cylinder having an opening at the bottom and being of a length several times its width, said cylinder being positioned axially of said burner assembly with the walls of said cylinder surrounding said burner assembly.

4. Apparatus according to claim 1, wherein said burner assembly includes a bore having a size in the order of magnitude of a hypodermic needle.

5. Apparatus for detecting quantitatively the presence of organic gases and vapours in a test gas, comprising:
    (1) a burner assembly;
    (2) means for supplying gaseous fuel which includes as the sole combustible constituent hydrogen gas;
    (3) means for feeding the test gas to the combustion zone of said burner assembly;
    (4) means for excluding dust and organic gases and vapours other than those included in said separate gas;
    (5) means for supplying a constant flow of oxygen-containing combustion-supporting gas to said combustion zone free from dust and organic vapors;
    (6) a collecting electrode spaced from said burner assembly and positioned above said burner flame;
    (7) means for conducting the products of combustion away from said combustion zone;
    (8) an electric circuit measuring means including means for
        (a) applying an electric potential difference across the flame from said burner assembly to said electrode;
        (b) a thermionic valve having an anode, a cathode and a grid;
        (c) an electrical connection, including a resistance-capacitive differentiating circuit, between said collecting electrode and the grid of said tube which collecting electrode is connected to the ground via an electrical resistance smaller than the resistance of the flame in the absence of organic vapour; and
        (d) indicating means for measuring the current flowing through the valve between said anode and said cathode.

6. Apparatus for detecting quantitatively the presence of organic gases and vapours in a test gas, comprising:
    (1) a burner assembly);
    (2) means for supplying gaseous fuel which includes as the sole combustible constituent hydrogen gas;
    (3) means for feeding the test gas to the combustion zone of said burner assembly;
    (4) means for excluding dust and organic gases and vapours other than those included in said separate gas;
    (5) means for supplying a constant flow of oxygen-containing combustion-supporting gas to said combustion zone free from dust and organic vapors;
    (6) a collecting electrode spaced from said burner assembly and positioned above said burner flame;
    (7) means for conducting the products of combustion away from said combustion zone;
    (8) an electric circuit measuring means including means for
        (a) applying an electric potential difference across the flame from said burner assembly to said electrode;
        (b) a thermionic valve having an anode, a cathode, and a grid;
        (c) an electrical connection between said collecting electrode and the grid of said tube which is connected to the ground via an electrical resistance smaller than the resistance of the flame in the absence of organic vapour;
        (d) a resistance-capacitive differentiating circuit connected between said anode and said cathode; and
        (e) indicating means for measuring the current flowing through the valve between said anode and said cathode.

7. Apparatus for detecting quantitatively the presence of organic gases and vapours, comprising:
    (1) a burner assembly;
    (2) means for supplying to said burner assembly a mixture consisting of hydrogen and nitrogen in constant proportions within the range 55%–65% by volume of nitrogen and 45% to 35% by volume of hydrogen at a constant rate;
    (3) means for feeding a separate gas in which the organic gas or vapour is to be detected to said burner assembly before said mixture reaches said burner;
    (4) a casing for excluding undesirable dust, gases and vapours from the combustion zone of said burner assembly;
    (5) means for supplying a constant flow of oxygen-containing combustion-supporting gas of constant composition to said combustion zone free of dust and organic vapours;
    (6) an electrically conductive, hollow, foraminous, collecting electrode extending above said burner flame at a constant location with respect to said burner assembly; such that the periphery of the electrode subtends at the burner nozzle an angle greater than 180°;
    (7) means insulating said electrode from said casing;
    (8) means for conducting the products of combustion from said combustion zone; and
    (9) an electrical measuring circuit including
        (a) in series connection with said collecting electrode, a source of direct current, said burner nozzle, and the hydrogen flame;

(b) said electric circuit including a thermionic valve having an anode, a cathode, and a controlling grid;
(c) the collecting electrode being connected to the ground by a resistance smaller than the resistance of the flame in the absence of organic vapour;
(d) an electrical connection, including a resistance-capacitive differentiating circuit, between said collecting electrode and the grid of said valve; and
(e) means for measuring the current flowing through said valve between said anode and said cathode.

8. Apparatus for detecting quantitatively the presence of organic gases and vapours, comprising:
(1) a burner assembly;
(2) means for supplying to said burner assembly a mixture consisting of hydrogen and nitrogen in constant proportions within the range 55%–65% by volume of nitrogen and 45% to 35% by volume of hydrogen at a constant rate;
(3) means for feeding a separate gas in which the organic gas or vapour is to be detected to said burner assembly before said mixture reaches said burner;
(4) a casing for excluding undesirable dust, gases and vapours from the combustion zone of said burner assembly;
(5) means for supplying a constant flow of oxygen-containing combustion-supporting gas of constant composition to said combustion zone free of dust and organic vapours;
(6) an electrically conductive, hollow, foraminous, collecting electrode extending above said burner flame at a constant location with respect to said burner assembly; such that the periphery of the electrode subtends at the burner nozzle an angle greater than 180°;
(7) means insulating said electrode free from said casing;
(8) means for conducting the products of combustion from said combustion zone; and
(9) an electrical measuring circuit including
    (a) in series connection with said collecting electrode, a source of direct current, said burner nozzle, and the hydrogen flame;
    (b) said electric circuit including a thermionic valve having an anode, a cathode and a controlling grid connected to the ground by a resistance less than the resistance of the flame in the absence of organic vapour;
    (c) an electrical connection between said collecting electrode and the grid of said valve;
    (d) a resistance-capacitive differentiating circuit connected between said anode and said cathode;
    (e) means for measuring the current flowing through said valve between said anode and said cathode.

9. Apparatus for detecting quantitatively the presence of organic gases and vapours in a test gas, comprising:
(1) burner assembly;
(2) means for supplying gaseous fuel which includes as the sole combustible constituent hydrogen gas;
(3) means for feeding the test gas to the combustion zone of said burner assembly;
(4) means for excluding dust and organic gases and vapours other than those included in said separate gas;
(5) means for supplying a constant flow of oxygen-containing combustion-supporting gas to said combustion zone free from dust and organic vapors;
(6) a collecting electrode spaced from said burner assembly and at least a portion of which electrode is positioned above said burner flame;
(7) means for conducting the products of combustion away from the combustion zone;
(8) an electric circuit measuring means including
    (a) means for applying an electric potential difference across the flame from said burner assembly to said electrode;
    (b) a thermionic valve having an anode, a cathode and a grid;
    (c) an electrical connection including a resistance-capacitive differentiating circuit between said collecting electrode and the grid of said valve which converts the linear impulse from said electrode to a non-linear response;
    (d) indicating means for measuring the current flowing through the valve between said anode and said cathode.

References Cited by the Examiner

UNITED STATES PATENTS

| | | | |
|---|---|---|---|
| 2,166,104 | 7/39 | Collbohm | 23—232 |
| 2,991,158 | 7/61 | Harley | 23—254 |
| 3,027,241 | 3/62 | Andreatch et al. | 23—232 |
| 3,039,856 | 6/62 | McWilliam | 23—232 |
| 3,049,409 | 8/62 | Dower | 23—232 X |

FOREIGN PATENTS 838,189   6/00   Great Britain.

OTHER REFERENCES

Borgen: German printed application, 1,092,699, November 1960.
Condon: "Anal. Chem.," 31 1717–1722 (1959).
Thompson: "J. of Chromatography," 2, 148–154 (1959).

MORRIS O. WOLK, *Primary Examiner.*
MAURICE A. BRINDISI, *Examiner.*